(12) United States Patent
Zimmer et al.

(10) Patent No.: US 7,930,728 B2
(45) Date of Patent: Apr. 19, 2011

(54) MECHANISM TO SUPPORT RIGHTS MANAGEMENT IN A PRE-OPERATING SYSTEM ENVIRONMENT

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 911 days.

(21) Appl. No.: 11/327,595

(22) Filed: Jan. 6, 2006

(65) Prior Publication Data

US 2007/0162955 A1  Jul. 12, 2007

(51) Int. Cl.
 *G06F 7/04* (2006.01)
 *G06F 17/30* (2006.01)
 *G06F 11/30* (2006.01)

(52) U.S. Cl. ........................................ 726/2; 713/193

(58) Field of Classification Search ...... 726/2; 713/193, 713/189
See application file for complete search history.

(56) References Cited

U.S. PATENT DOCUMENTS

| | | | |
|---|---|---|---|
| 5,708,709 A * | 1/1998 | Rose | 705/59 |
| 7,134,118 B1 * | 11/2006 | McNutt | 717/138 |
| 7,634,629 B2 * | 12/2009 | Nemiroff et al. | 711/163 |
| 2003/0051021 A1 * | 3/2003 | Hirschfeld et al. | 709/223 |
| 2005/0071668 A1 * | 3/2005 | Yoon et al. | 713/200 |
| 2005/0177829 A1 * | 8/2005 | Vishwanath | 717/177 |
| 2005/0283826 A1 * | 12/2005 | Tahan | 726/2 |
| 2006/0015718 A1 * | 1/2006 | Liu et al. | 713/164 |
| 2006/0015732 A1 * | 1/2006 | Liu | 713/176 |
| 2006/0137022 A1 * | 6/2006 | Kilian-Kehr et al. | 726/27 |
| 2006/0291663 A1 * | 12/2006 | Aissi et al. | 380/285 |
| 2007/0006169 A1 * | 1/2007 | Iliev et al. | 717/131 |
| 2007/0006282 A1 * | 1/2007 | Durham et al. | 726/2 |
| 2007/0006306 A1 * | 1/2007 | Seifert et al. | 726/22 |
| 2007/0050294 A1 * | 3/2007 | Trottier et al. | 705/50 |

* cited by examiner

*Primary Examiner* — Christian LaForgia
*Assistant Examiner* — Jahangir Kabir
(74) *Attorney, Agent, or Firm* — Blakely, Sokoloff, Taylor & Zafman LLP

(57) ABSTRACT

A computer system is disclosed. The computer system includes a chipset to access one or more partitioned regions of a storage device and a network controller coupled to the chipset. The network controller includes a manageability engine (ME) to enforce one or more policies as conditions for accessing each of the one or more partitioned regions of the storage device.

4 Claims, 4 Drawing Sheets

MECHANISM TO SUPPORT RIGHTS MANAGEMENT IN A PRE-OPERATING SYSTEM ENVIRONMENT

FIELD OF THE INVENTION

The present invention relates to computer systems; more particularly, the present invention relates to licensing and verification of operating systems.

BACKGROUND

With the increase of network distribution of operating systems (OSs), operating system vendors (OSVs) (e.g., Redhat Linux or Microsoft) aspire to, in concert with the original equipment manufacturers (OEM) (e.g., Dell or Hewlett-Packard) manage licensing, subscription, boot policy, and expiry of the operating systems on their platforms.

However, a problem with such an approach is that true licensing and control of OS booting and installation is difficult to perform safely from within the OS. For instance, during a system restart, the OS may be attacked via root-kits, viruses, and other malicious content.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
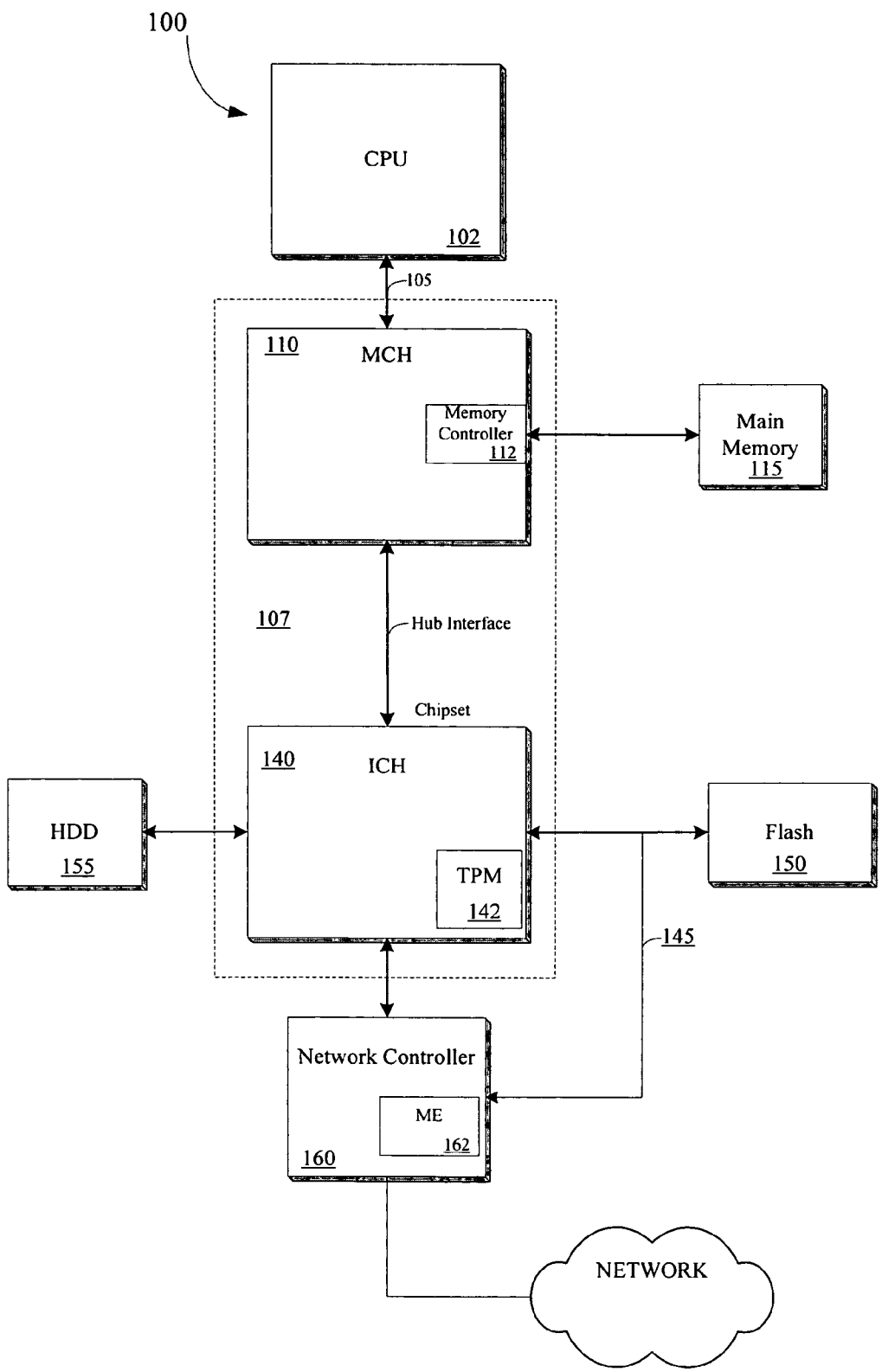
FIG. 1 is a block diagram of one embodiment of a computer system.

A mechanism for OS licensing and verification is described. During startup there is a determination as to whether license or integrity updates are available for a computer system. If updates are available, a remote authority is contacted via a network coupled to a network controller. Subsequently, it is determined whether a license for a particular OS has expired. If the OS license has expired, access to a hard disk region associated with the OS is disabled.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read only memories (CD-ROMs), and magnetic-optical disks, read-only memories (ROMs), random access memories (RAMs), Erasable Programmable Read-Only Memories (EPROMs), Electrically Erasable Programmable Read-Only Memories (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102.

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a trusted platform module (TPM) 142. TPM 142 includes protected registers that are writable by commands that may only be initiated by trusted microcode in CPU 102. Protected microcode is microcode whose execution may be initiated by authorized instruction(s) and/or by hardware that is not controllable by unauthorized devices. In a further embodiment, ICH 140 is coupled to a hard disk drive (HDD) 155 via an interface (e.g., an IDE (Integrated Drive Electronics) IDE interface).

According to one embodiment, a flash memory device 150 and network controller 160 are coupled to ICH 140. In such an embodiment, network controller 160 is coupled to ICH 140 via a Peripheral Component Interconnect Extended (PCI-X) interface. In addition, network controller 160 is also coupled to flash memory device 150.

In one embodiment, both ICH 140 and network controller 160 are coupled to access flash 150 via a shared serial peripheral interface (SPI) 145. Thus, SPI 145 enables immediate access of flash 150 to ICH 140 and network controller 160. ICH 140 may access flash 150 to retrieve data for CPU 102. For example, basic input/output system (BIOS) may access flash 150 at boot time, as well as during run time. In one embodiment, ICH 140 implements a Request/Grant protocol to CPU 102. Network controller 160 may access flash 150 to retrieve control information to facilitate management of network connections.

According to one embodiment, network controller performs Intel® Active Management Technology (AMT). Intel® AMT stores hardware & software information in nonvolatile memory to enable built-in manageability. Intel® AMT allows for the discovery of assets even while computer system 100 is powered off.

In one embodiment, network controller 160 includes a manageability engine (ME) 162 that controls access to HDD 155. In such an embodiment, ME 162 is a micro-controller implemented to enforce policies received from a remote agent (e.g., OSV, original equipment manufacturer (OEM), information technology (IT) department, etc.) via a coupled network with regard to communicating with HDD 155. For example, a system startup (boot) policy may be downloaded to ME 162 from an OSV. ME 162, in turn, evaluates the policy against local user settings credentials in TPM 142, etc. ME 162 subsequently provides access to HDD 155 if the policy conditions are in conformance.

In another embodiment, TPM 142 may be included within network controller 160 to enable the AMT-managed trust scenarios to directly use TPM 142. For example, AMT firmware (not shown) could use the TPM 142 "Seal" capability to ensure integrity of the OS boot policy, or "attest" to the remote authority during provisioning of the HDD boot credentials, etc.

In a further embodiment, HDD 155 may be divided into separate regions with ME providing access to a particular region corresponding to a particular OS or software. For instance, multiple OSs may be stored at HDD 155 at various partitions. Access to each OS is controlled by ME 162.

In one embodiment of a policy enforced by ME 162 is licensing. Thus, ME 162 ensures that only appropriately-licensed platforms can access a portion of HDD 155 that includes the respective operating system. With ME 162 OSVs may license an OS for a predetermined time period, with the computer system 100 users license expiring upon the time period elapsing. For example, the license may be a one year license expiring on a particular date (e.g., Jan. 1, 2006).

An OSV may further download a policy into ME 162 which indicates that the OS may be booted at computer system 100 until December 31, 2005. Although the OS remains on HDD, ME 162 precludes the OS from being booted at computer system after Dec. 31, 2005 until the license has been renewed.

In another embodiment, ME 162 may enforce an integrity policy. In such an embodiment, ME 162 checks the integrity (e.g., has OS been tampered with) of the OS stored at HDD 155 prior to booting. In one embodiment, OSV signs an OS load with a Rivest, Shamir, and Adleman (RSA) private key, and securely provisions and installs the OS load via ME 162. Thus, whenever the OS is to be booted ME 162 uses a RSA public key to check the integrity of the OS.

In yet a further embodiment, ME 162 may be implemented to lock-down a portion of HDD 155 that includes other high-value content, such as music or movie files (e.g., digital video disc (DVD), Moving Picture Experts Group 1 (MPEG-1) Audio Layer-3 (MP3's), etc).

Figure 2:
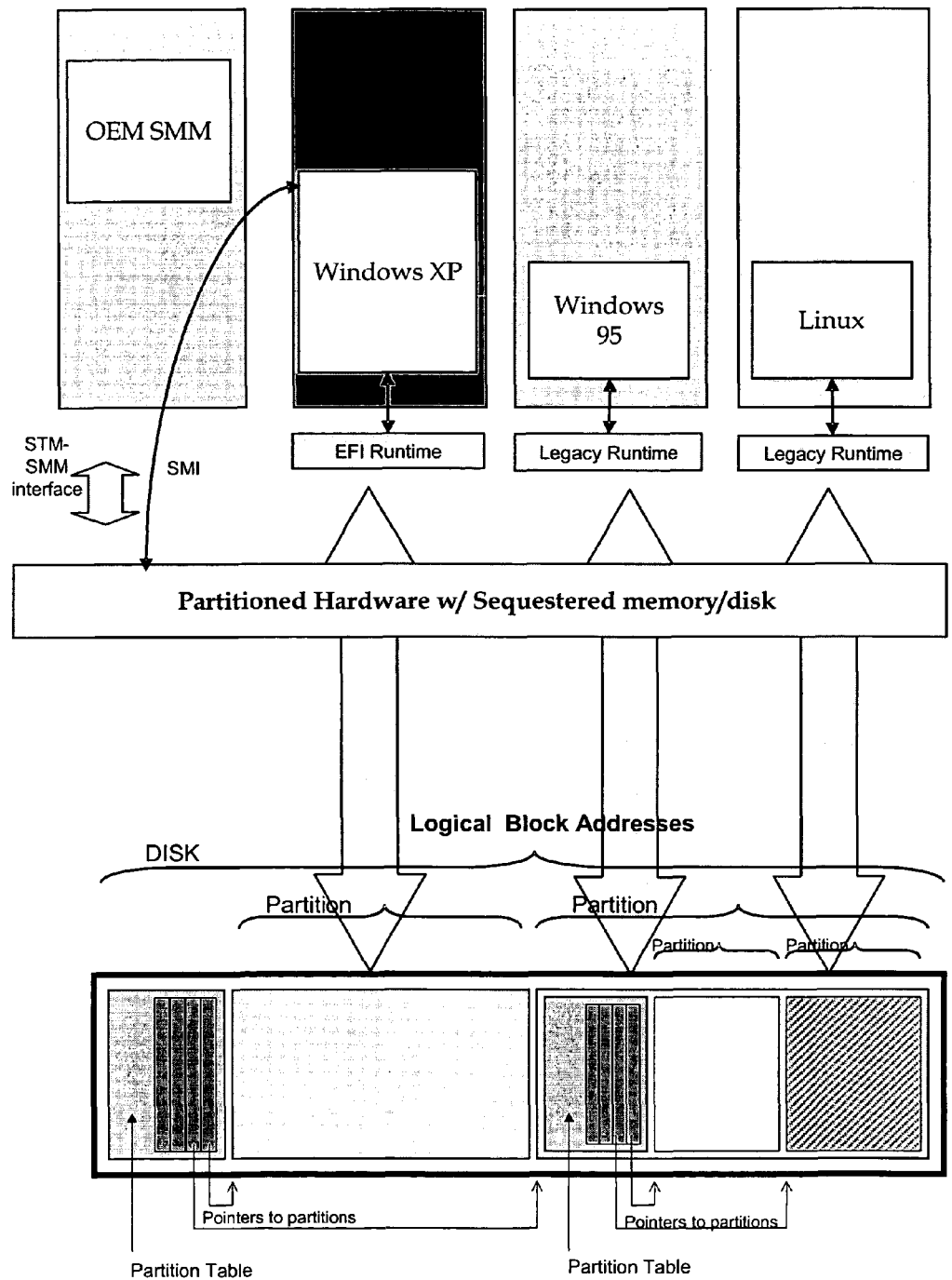
FIG. 2 illustrates a logical representation of one embodiment of a computer system.

Although described as a micro-controller, ME 162 may be implemented in firmware. However in another embodiment, one of multiple CPU 102 cores may be implemented to perform the policy functioned described above with respect to ME 162. FIG. 2 illustrates a logical representation of one embodiment of computer system 100 implementing a CPU 102 core for policy enforcement.

As illustrated in FIG. 2, multiple OSs may be stored at HDD 155 at various partitions. One of the OSs (e.g., the Linux OS) is isolated to operate on one of the CPU cores in order to perform policy enforcement (e.g., policy enforcement core). Access to each OS stored on HDD 155 is controlled by partitioned hardware with sequestered memory/disk, which is controlled by the policy enforcement core.

In one embodiment, HDD 155 is partitioned based upon logical block addresses (LBA) ranges. In LBA each sector is assigned a unique sector number rather than referring to a cylinder, head and sector number. Thus, the sectors are numbered 0, 1, 2, etc. up to (N−1), where N is the number of sectors on the disk. Further, HDD 155 includes one or more partition tables having pointers to partitions.

Figure 3:
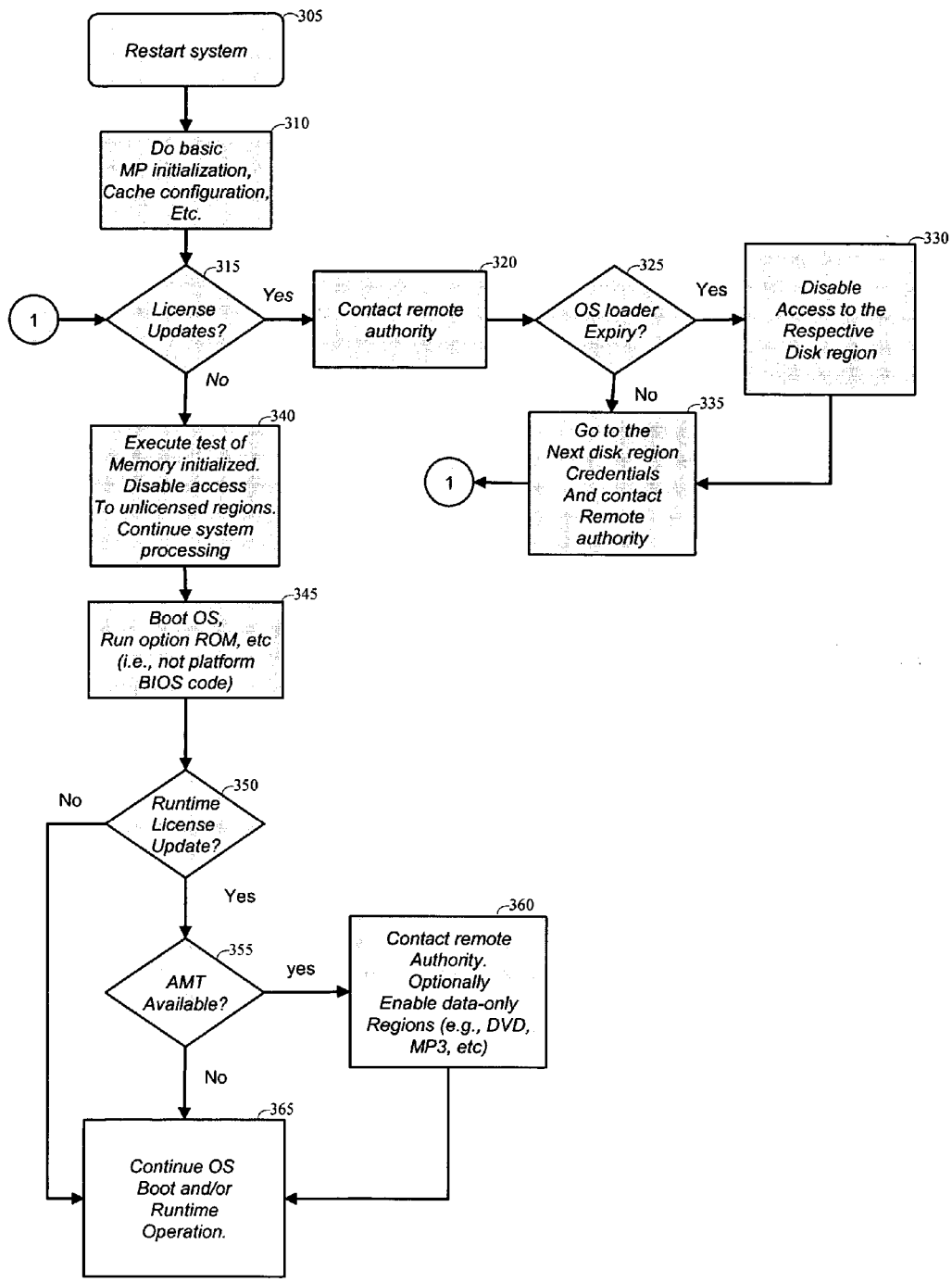
FIG. 3 is a flow diagram of one embodiment of a computer system boot process.

FIG. 3 is a flow diagram of one embodiment of a computer system boot process. At processing block 305, computer system 100 is restarted. At processing block 310, basic computer system 100 initialization and configuration occurs. For example, initialization occurs to awaken CPU 102 and cache configuration may take place.

At decision block 315, there is a determination as to whether any license or integrity updates are available. If updates are available, ME 162 contacts a remote authority via a network coupled to network controller 160, processing block 320. At decision block 325 it is determined whether a license for a particular OS has expired.

If the OS license has expired, access to the region of HDD 155 associated with the OS is disabled at processing block 330. At processing block 335, the process proceeds to credentials corresponding to the next disk region and the remote authority is contacted. Subsequently, control is returned to decision block 315 where it is determined whether other license or integrity updates are available. If at decision block 325 it is determined that the OS license has not expired, control is forwarded directly to processing block 335 and on to processing block 315.

At decision block 315 no updates are available, system processing continues at processing block 340. For example, tests of memory 115 are executed and access to unlicensed HDD 155 regions are disabled. At processing block 345, the OS is booted. Upon initiation of the OS boot, there is a determination at decision block 350 as to whether a runtime license update has been received at ME 162. If there is a runtime update, it is determined whether AMT is available at computer system 100. If AMT is available, the remote authority is contacted at processing block 360. At processing block 365, the OS boot process, or runtime operation, at computer system 100 is continued. Otherwise, if a runtime license has not been received or AMT is unavailable at computer system 100 control is forwarded directly to processing block 365.

Figure 4:
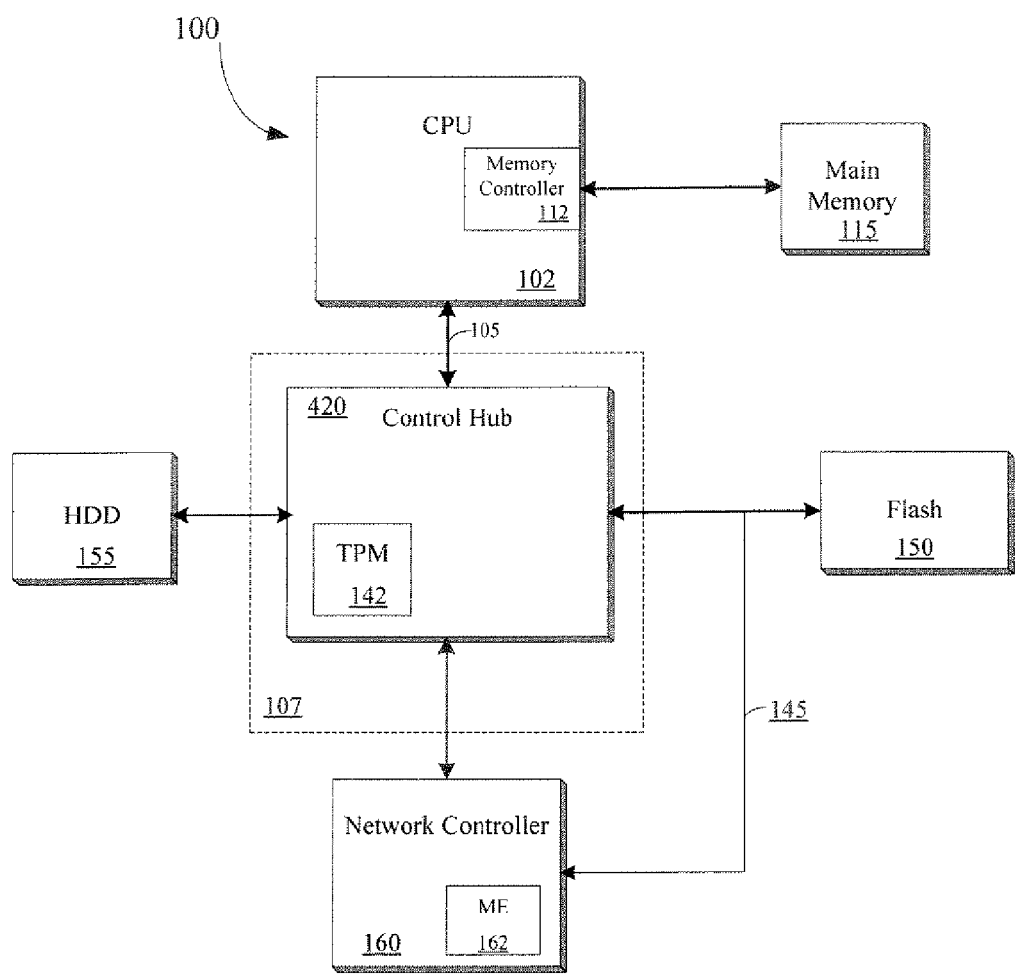
FIG. 4 is a block diagram of another embodiment of a computer system.

FIG. 4 illustrates another embodiment of computer system 100. In this embodiment, chipset 107 includes a single control hub 420 as opposed to a separate MCH and ICH. In such an embodiment, memory controller 112 is included within CPU 102, with memory 115 being coupled to CPU 102.

The above-described mechanism provides an execution environment external to a main OS to enforce policies of inhibiting access to a disk drive based upon appropriate license expiry. Further, the mechanism allows for an OSV to work in concert with an OEM to manage licensing, subscription, boot policy, and expiry of the OSVs OS on the OEM platforms.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A computer system comprising:
   a storage device having:
      two or more sectors partitioned based upon logical block address (LBA) ranges, each sector having a unique sector number, each of the two or more sectors storing a respective operating system; and
      one or more partition tables including pointers to each sector;
   a chipset coupled to the storage device to access the sectors of the storage device, the chipset including a trusted platform module (TPM) having protected registers that are writable by commands initiated by trusted microcode; and
   a network controller coupled to the chipset having a manageability engine (ME) to receive policies from one or more remote agents via a network, to evaluate the policies against credentials in the TPM and to enforce the policies, wherein for each of the two or more sectors:
      the ME to determine, prior to the computer system performing a boot up, whether a respective license for the operating system stored in the sector has expired, the license for allowing execution of the operating system by the computer system; and
      where the respective license for the operating system is determined to have expired, the ME to disable an access to the sector by the computer system.

2. The computer system of claim 1 wherein trusted microcode is microcode in which execution may be initiated by authorized instructions and hardware not controlled by unauthorized devices.

3. The computer system of claim 1 wherein the ME is a micro-controller.

4. The computer system of claim 1 wherein the ME disables the first sector of the storage device if the first policy condition corresponding to a program stored at the first sector has not been fulfilled.

* * * * *